Feb. 10, 1970          W. L. KINNEY          3,494,113
               AIR FILTER ASSEMBLY AND SUB-ASSEMBLIES
Filed May 22, 1968                          3 Sheets-Sheet 1
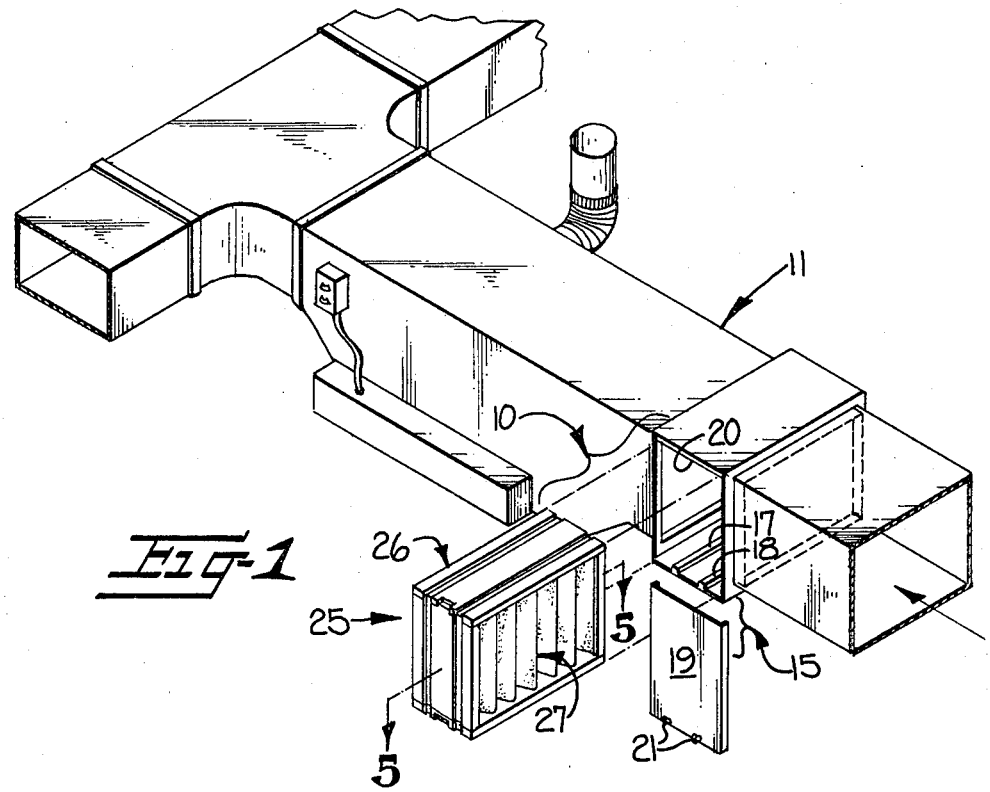
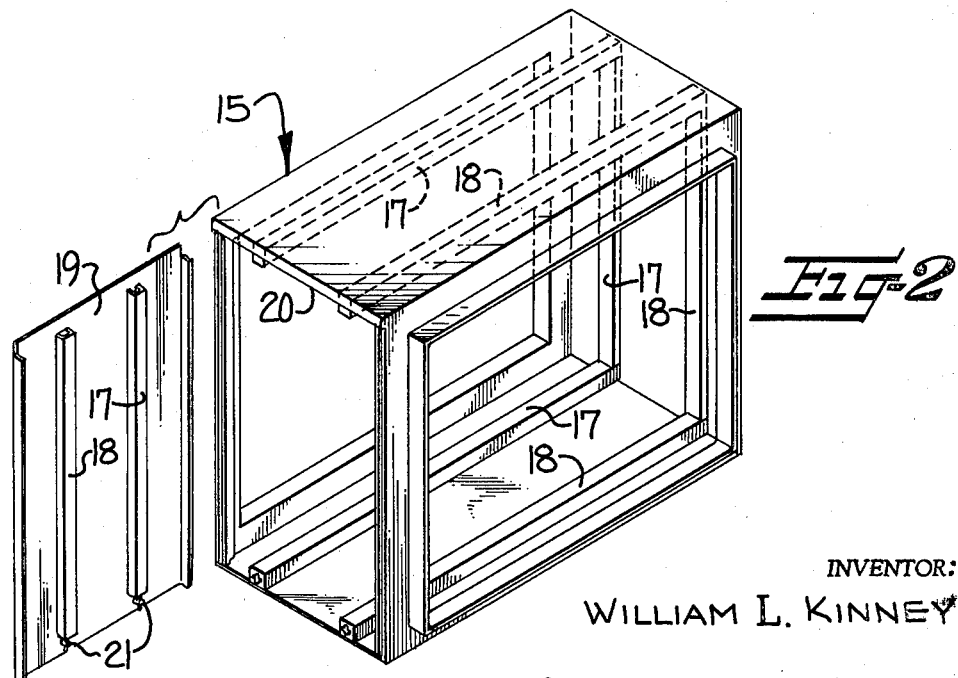
INVENTOR:
WILLIAM L. KINNEY
BY Parrott, Bell, Seltzer, Park & Gibson
ATTORNEYS

INVENTOR:
WILLIAM L. KINNEY

ATTORNEYS

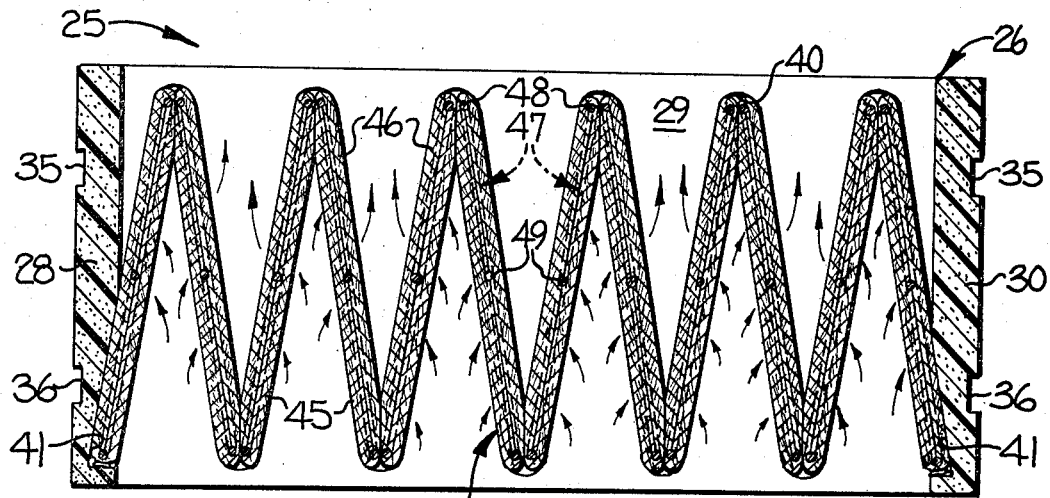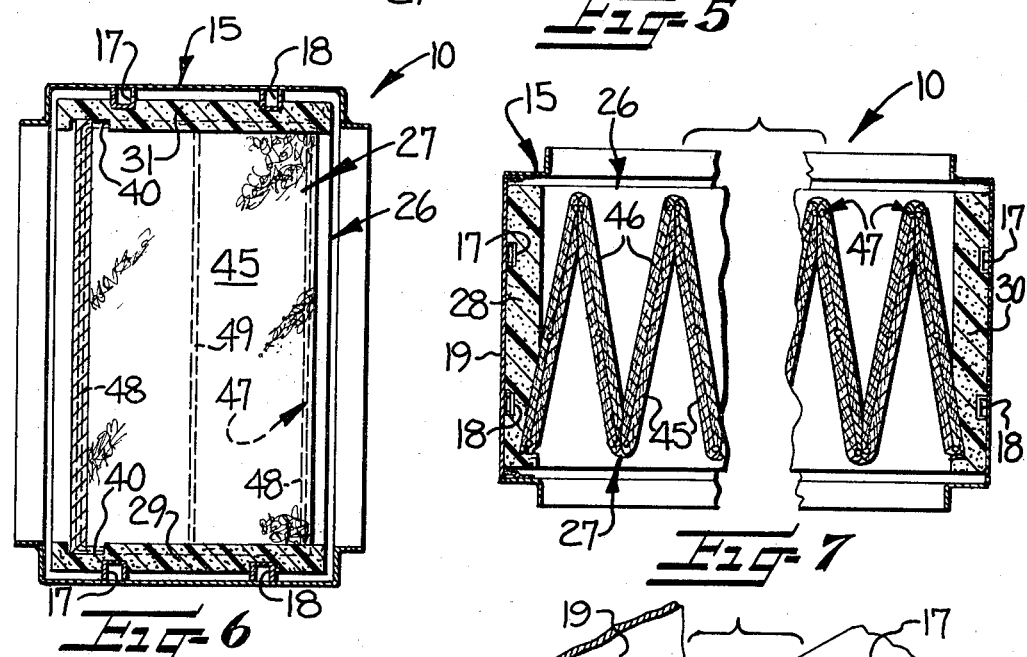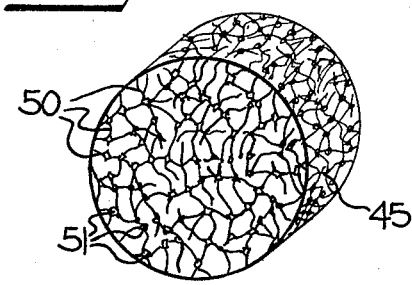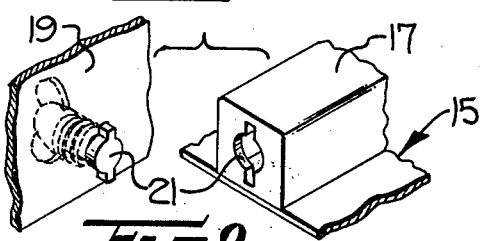

United States Patent Office 3,494,113
Patented Feb. 10, 1970

3,494,113
AIR FILTER ASSEMBLY AND SUB-ASSEMBLIES
William L. Kinney, Charlotte, N.C., assignor to Microtron Corporation, a corporation of North Carolina
Filed May 22, 1968, Ser. No. 771,686
Int. Cl. B01d 46/10, 46/04
U.S. Cl. 55—481                                3 Claims

ABSTRACT OF THE DISCLOSURE

An air filter assembly and sub-assemblies thereof for use in air cooling and heating systems and characterized by easy removal of the interior components for replacement purposes, comprising a housing adapted to be secured in and forming a part of an air flow passageway of the cooling and heating system, a removable, preferably closed-cell foam, cartridge adapted to be positioned within the housing in sealing engagement therewith and allowing the passage of air therethrough as it passes through the passageway, and replaceable, preferably reinforced resin-bonded, non-woven filter media adapted to be positioned within the cartridge in a pleated arrangement forming a plurality of downstream pockets in the air flow stream and covering the entire opening in the cartridge in sealing engagement therewith.

---

This invention relates to an air filter assembly and sub-assemblies for use in air cooling and heating systems and is characterized by easy removal and dismantling of the interior components for replacement purposes.

Heretofore, in central air conditioning and heating systems for use in the home, office, etc., replaceable, flat, panel-type filters have normally been employed. These panel-type filters are supported in rectangular frames in the air flow passageway of the system and may be employed in banks of one filter to any number of filters, as desired. These filters usually require replacement at frequent intervals according to the amount of contamination in the air. Due to the nature of these flat, panel-type filter units, the first filter unit or units in the bank on the upstream side of the air flow normally provides the bulk of the initial filtering action and becomes dirty and clogged first resulting in considerable resistance to the flow of air at that point and the need for more frequent replacement of the first units.

More recently, due to the above problems, a single filter assembly has been proposed which provides filter media in a pleated arrangement forming a plurality of downstream extending pockets therein which increases the effective filter area for a single unit and may replace a plurality of the heretofore used panel-type filters. These pleated, pocketed filters may also be used in banks when a large amount of contamination is present in the air flowing through the system. However, normally only one of these pleated, pocketed filter assemblies is necessary.

However, problems have been encountered with the newer pleated, pocketed type filter assemblies inasmuch as the nature of the arrangement of the filter media therein in the pleated, pocketed configuration renders the assembly burdensome and cumbersome when replacement of the filter media is required. All of the prior types of pleated, pocketed filter assemblies presently known include a complicated arrangement of housings, wire reinforcing grids and filter media which render very difficult the operation of withdrawing the assembly from the air flow passageway and replacing the filter media therein.

Therefore, it is the object of this invention to provide a simple air filter assembly and sub-assemblies for use in air cooling and heating systems which provide easy removal and dismantling of the interior components for replacement purposes and which provide a light-weight, low cost construction which is particularly appealing to the domestic user.

By this invention, it has been found that the above object may be accomplished by providing an air filter assembly comprising a hollow, open-ended housing having a generally rectangular cross-section and which is adapted to be secured in an air flow passageway of the cooling and heating system and which is adapted to have the open ends thereof connected to respective portions of the air flow passageways so that the housing will form a part of the air flow passageway. The housing also includes sealing means on the inside surface thereof and means for providing access to the interior thereof.

This assembly further comprises a removable, open-ended hollow cartridge having a rectangular cross-section and adapted to be positioned within the housing for allowing the passage of air therethrough as the air passes through the passageway. The cartridge includes sealing means on the outside surface thereof, adapted to mate with the housing sealing means to prevent the flow of air between the housing and the cartridge, and complementary, zig-zag shaped, sealing grooves disposed on the inside surface of the cartridge along the entire dimensions thereof. The cartridge is preferably formed of rigid, compressible, closed-cell foam material which provides a light-weight, low cost structure which can be easily removed and dismantled for replacement purposes and which, through the compressibility characteristic, allows a forced friction fit with the housing for sealing purposes.

The assembly further includes removable, replaceable, porous filter media adapted to be positioned within the cartridge in a pleated arrangement forming a plurality of downstream extending pockets in the air flow stream passing through the assembly and adapted to have the opposite edges thereof positioned within the cartridge sealing grooves and to extend across the entire interior opening in the cartridge in sealing engagement therewith to force the flow of air through the media. The air filter media preferably comprises two superimposed continuous layers of resin-bonded, non-woven material, a plurality of rigid, generally rectangular, separate, frame members positioned between the superimposed layers of non-woven material in a spaced, side-by-side relationship for aiding in the support of the filter media in the pleated, pocketed configuration, and means securing the superimposed layers of non-woven material together around the outside periphery of each of the frame members for holding the layers together and for holding the frame members in the aforesaid positions so that the filter media may bend in the spaces between the frame members for forming the pleated, pocketed arrangement.

Some of the objects and advantages of this invention having been stated, other objects and advantages will appear as the description proceeds, when taken in conjunction with the accompanying drawings in which:

FIGURE 1 is a partial, schematic, perspective view, portions of which are exploded, illustrating the air filter assembly of this invention located in an air flow passageway of an air cooling and heating system;

FIGURE 2 is a perspective view of the housing forming a part of the air filter assembly of this invention and illustrating the access means thereto open;

FIGURE 5 is a cross-section view of the air filter cartridge assembly taken along the line 5—5 of FIGURE 1;

FIGURE 6 is a vertical cross-sectional view of the air filter assembly;

FIGURE 7 is a horizontal cross-sectional view, broken away, of the air filter assembly;

FIGURE 8 is an enlarged perspective detail of the non-woven material utilized in the air filter assembly and taken within the circle 8 of FIGURE 3; and FIGURE 9 is an enlarged perspective detail of one of the securing latches for the access means to the housing forming part of the air filter assembly of this invention.

Figure 3:
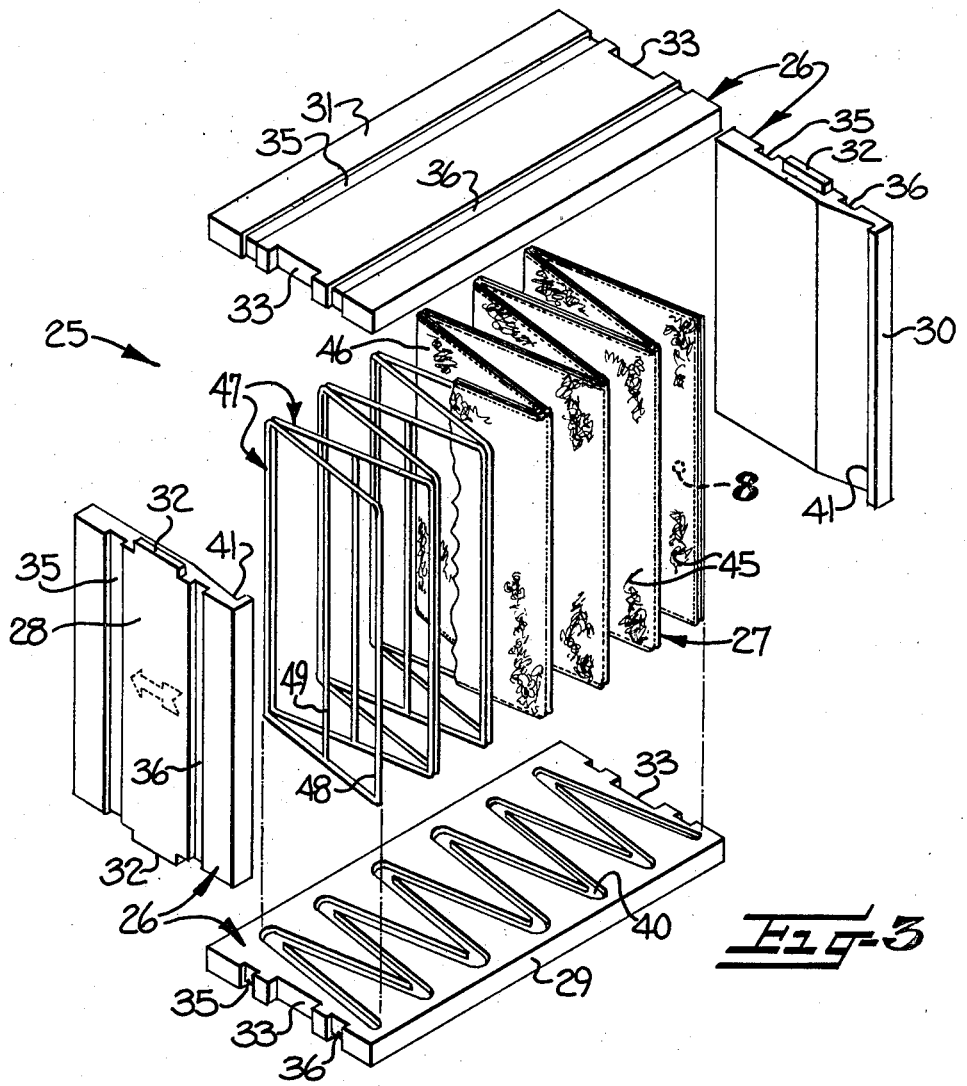
FIGURE 3 is an exploded, perspective view, parts of which are broken away, of the air filter cartridge assembly of this invention which is adapted to be placed within the housing of FIGURE 2.

Referring now to the drawings, the air filter assembly of this invention for use in air cooling and heating systems is referred to generally in FIGURE 1 by the reference numeral 10. This air filter assembly is shown in FIGURE 1 positioned in an enclosed air flow passageway 11 of an air cooling and heating system. The arrow in FIGURE 1 represents the direction of flow of the air stream through the air flow passageway.

The air filter assembly of this invention comprises a hollow, open-ended housing 15 having a generally rectangular cross-section and normally in the shape of a parallelepiped and adapted to be secured at the open ends thereof by protruding lips into the open ends of the enclosed air flow passageway 11 by a friction fit, welding or the like so that the housing 15 will form an integral part of the air flow passageway 11, as may be seen in FIGURE 1.

The housing 15 further includes sealing means in the form of raised ribs 17 and 18 extending around the entire interior periphery of the housing for purposes to be described hereinafter. It is preferred to have two of these ribs, as illustrated in the drawings; however, it is to be understood that one or any number of these ribs could be used.

The housing 15 also includes means for providing access to the interior thereof and, as illustrated in the drawings, this means comprises a removable side 19 which may be secured to the remaining portion of the housing 15 by sliding the upper end thereof, under a protruding lip 20 and by latching the lower end of the removable side 19 to the housing 15 by latch members 21. The latch members 21 may be of any desired type and one suitable latch means is illustrated in FIGURE 9.

The housing 15 is preferably formed of sheet metal or any type of rigid material which would be comparable to the material utilized for forming the remaining portions of the air passageway 11 in the heating and cooling system.

The air filter assembly further includes an air filter cartridge sub-assembly, generally indicated in the drawings by the reference numeral 25, which is adapted to be removably positioned within the housing 15. This cartridge sub-assembly 25 comprises a hollow, open-ended cartridge 26 having a generally rectangular cross-section and filter media 27, to be described more fully hereinafter.

The cartridge 26 is of a complementary shape to the housing 15 and is adapted to be positioned therein so that the open ends thereof communicate with the open ends of the housing 15 and so that the air stream may pass therethrough as it passes through the air passageway. The cartridge 26 comprises a rigid, somewhat compressible, closed-cell, foam material which may be polystyrene or other suitable foam material of comparable characteristics to provide a light-weight, low-cost construction which can be easily inserted in and removed from the air flow passageway.

Preferably, the cartridge 26 comprises four, separate, molded sides 28, 29, 30 and 31 which have mating tongue 32 and groove 33 means thereon adapting the sides to be secured together by a friction fit and to be easily dismantled, as shown in FIGURE 3. As shown in FIGURE 3, the opposite upper and lower sides or the longer sides 29 and 31 are complementary and include the grooves 33 on each end thereof. The shorter sides 28 and 30 are also complementary and include the tongues 32 on the opposite ends thereof for mating with the grooves 33 on the sides 29 and 31.

The cartridge 26 also includes a pair of elongate, longitudinally extending sealing grooves 35 and 36 therein which extend all the way around the outside periphery of the cartridge 26 and are of slightly smaller dimensions than the sealing ribs 17 and 18 on the housing 15. The grooves 35 and 36 are so located as to mate with the sealing ribs 17 and 18 and, inasmuch as the cartridge is formed of a somewhat compressible foam material, the material surrounding the grooves will be compressed when the ribs 17 and 18 are forced therein to insure sealing engagement between the housing and the cartridge, as shown in FIGURES 6 and 7.

The cartridge 26 further includes complementary, zig-zag shaped, sealing grooves 40 on opposite inside surfaces of the sides 29 and 31 of the cartridge 26 and which extend along the entire dimensions thereof, as shown in FIGURE 3. The shorter sides 28 and 30 also include longitudinally extending sealing grooves 41 adjacent one edge thereof, as may be seen in FIGURE 3. These sealing grooves 40 and 41 cooperate to hold the filter media 27 in a manner to be described hereinafter.

As stated hereinbefore, the air filter assembly 10 further comprises removable, replaceable, porous filter media 27 adapted to be positioned within the cartridge 26 in a pleated arrangement forming a plurality of downstream pockets in the air flow stream passing through the assembly, as may be seen in FIGURES 1, 3, 5 and 7. This arrangement provides a large effective area of filtering surfaces for the air stream as it passes through the assembly of this invention.

The air filter media 27 comprises two superimposed, generally rectangular, continuous layers 45 and 46 of resin-bonded, non-woven material. The air filter media further comprises a plurality of rigid, generally rectangular, separate, frame members 47 positioned between the superimposed layers 45 and 46 of non-woven material in a spaced, side-by-side relationship, as may be seen in FIGURE 4. Each of these frame members 47 comprises integral side portions 48 secured together generally in the form of a rectangle and a longitudinally extending, integral, central, reinforcing leg 49 secured to the shorter side portions 48 and extending parallel with the longer leg portions 48, as may be seen particularly in FIGURES 3 and 4.

Figure 4:
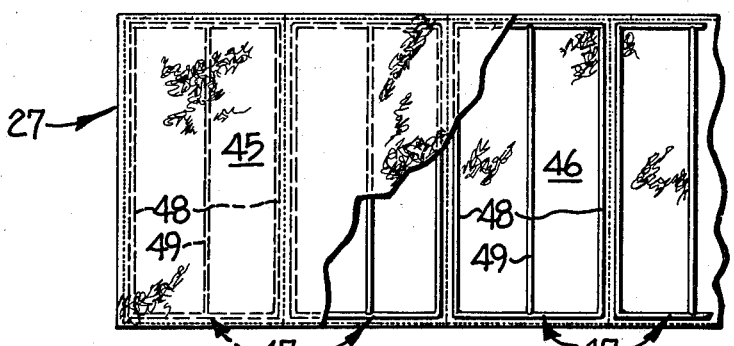
FIGURE 4 is a partial plan view, broken away, of a portion of the filter media utilized in the assembly of this invention.

The filter media 27 further includes means securing the superimposed layers 45 and 46 of non-woven material together around the outside periphery of each of the frame members for both holding the layers together and for holding the frame members in the aforesaid spaced, side-by-side relationship so that the filter media may bend in the spaces between the frame members 47 for forming the pleated, pocketed arrangement. This securing means is preferably in the form of lines of stitching, as illustrated in FIGURE 4.

The above-described filter media 27 is positioned within the cartridge 26 in the pleated, pocketed arrangement illustrated in the drawings by bending the filter media at the spaces between reinforcing frame members to form a pleated, pocketed arrangement and securing the zig-zag edges of the filter media in the grooves 40 of the cartridge 26. The short ends of the filter media 27 are positioned in the sealing grooves 41 and these ends are located on the upstream side of the cartridge when placed in the air passageway 11 so that the flow of air will hold the short ends of the filter media 27 in the grooves 41 and prevent the escape of air therearound and force the air through the filter media 27. Due to the compressibility of the cartridge material 26, the filter media 27 may be force fitted into the zig-zag shaped sealing grooves 40 to insure sealing engagement therebetween.

The layers 45 and 46 of non-woven material preferably comprise an air-laid batt of non-woven fibers 50 disposed in random, intermingled, three-dimensional arrangement and bonded with a resinous bonding material 51 at least at spaced locations where the fibers cross to form an integral, non-woven fabric structure, as shown in FIGURE 8.

The fibers 50 may be any type of suitable fibers and particularly fibers selected from the group consisting of polyester, nylon, acrylic, acetate, modacrylic, triacetate, polypropylene, polyethylene or combinations thereof. The resinous bonding material 51 may be any suitable type of resinous bonding material and particularly those bonding materials selected from the group consisting of acrylic, vinyl, melamine, polyvinyl chloride, polyvinyl acetate, butadiene styrene, butadiene acrylonitrile, melamine formaldehyde, urea formaldehyde, phenol formaldehyde, polyvinylidene chloride, epoxy type resins or combinations thereof.

To form the layers 45 and 46 of non-woven material, any suitable type of air-laying machine may be used to form the batt of non-woven fibers and the batt of non-woven fibers may be bonded by any conventional method, such as spraying or dipping, etc. The density of the batts of non-woven fibers may vary according to the degree of filtering desired, and preferably the layers are of different densities. In this regard, the layer 45 would preferably be formed less dense then the layer 46 so that the air stream passes through the less dense layer first to obtain a progressively greater filtering action as it then passes through the more dense layer. This arrangement prevents clogging on the entrance surface of the filter media and obtains a more even filtering action as the air passes therethrough.

In use and when the filter media 27 has become dirty and is ready for replacement, it may be easily replaced by unlatching the latch means 21 on the housing 15 and removing the side 19 from the housing 15. The cartridge assembly 25 may then be pulled out of the housing 15 and the cartridge 26 dismantled by removing one or more of the sides 28, 29, 30 and 31, as described above, allowing withdrawal of the filter media 27 and replacement thereof by a new, clean filter media. The new filter media would be bent into the pleated, pocketed shape, illustrated in FIGURE 3, and placed within the sealing grooves 40 and 41 of the cartridge 26. The cartridge 26 would then be re-assembled by a force fit of the tongue and groove means 32 and 33 on the ends of the sides of the cartridge 26 and the cartridge may then be replaced through a force friction fit within the housing 15.

As may be seen, the filter assembly 15 and its cartridge sub-assembly 25 and filter media sub-assembly 27 provide a simple, low-cost construction which may be easily assembled and disassembled and the interior parts thereof may be easily dismantled for replacement of the filter media therein when it becomes dirty and requires replacement.

What is claimed is:

1. An air filter assembly for use in an air flow passageway of air cooling and heating systems and being characterized by easy removal and dismantling of the interior components for replacement purposes, said assembly comprising:
   (a) a hollow housing means having a generally rectangular cross-section and openings in two parallel sides thereof to form a passageway therethrough and including means for securing said housing means in the air flow passageway of the cooling and heating system so that said openings in and said passageway through said housing means will align with and form a part of the air flow passageway of the air cooling and heating system, said housing means further including
      (1) sealing means on the inside surface thereof, and
      (2) removable door means on one side thereof for providing access to the interior thereof when said housing means is secured in the air flow passageway of the air cooling and heating system;
   (b) a hollow cartridge means having a generally rectangular cross-section and defining two parallel open sides therein to form a passageway therethrough for being removably positioned within said housing so that an air stream passing through the air cooling and heating system will pass through said cartridge passageway, said cartridge means further including
      (1) sealing means on the outside surface thereof for mating with said sealing means on the inside surface of said housing to prevent the flow of air between said housing means and said cartridge means, and
      (2) complementary, zig-zag shaped, sealing groove means formed on opposite side surfaces of said cartridge means along the entire dimensions thereof; and
   (c) porous filter media means positioned within said cartridge means in a pleated arrangement forming a plurality of downstream pockets in the air flow stream passing through said assembly and having opposite edges thereof positioned within said zig-zag shaped sealing groove means and extending across said entire cartridge passageway to force the air stream through said media means, said filter media means comprising
      (1) two superimposed, generally rectangular, continuous layers of resin-bonded, non-woven material,
      (2) a plurality of rigid, generally rectangular, separate, frame members positioned between said superimposed layers of non-woven material in a spaced, side-by-side relationship for cooperating with said cartridge means to support said filter media means in the pleated, pocketed configuration within said cartridge means, and
      (3) means securing said superimposed layers of non-woven material together around the outside periphery of each of said separate frame members for holding said layers together and for holding said frame members in the aforesaid spaced, side-by-side positions so that said filter media may bend in the spaces between said frame members for forming the pleated, pocketed arrangement when placed in said cartridge.

2. An air filter assembly, as set forth in claim 1, in which said layers of non-woven material have varying densities and are adapted to be placed in the air stream so that the air passes through the less dense layer first to obtain a progressively greater filtering action as it passes through both of said layers of material and to prevent clogging on the entrance surface of said layers.

3. An air filter assembly for use in an air flow passageway of air cooling and heating systems and being characterized by easy removal and dismantling of the interior components for replacement purposes, said assembly comprising:
   (a) a hollow housing means having a generally rectangular cross-section and openings in two parallel sides thereof to form a passageway therethrough and including means for securing said housing in the air flow passageway of the cooling and heating system so that said openings in and said passageway through said housing means will align with and form a part of the air flow passageway of the air cooling and heating system, said housing means further including
      (1) sealing means on the inside surface thereof comprising protruding, elongate, rib members extending along the entire dimensions of the surface thereof, and (2) removable means on one side thereof for providing access to the interior thereof when said housing means is secured in the air flow passageway of the air cooling and heating system;

(b) a hollow cartridge means having a generally rectangular cross-section and comprising rigid, somewhat compressible, closed-cell foam material and four separate sides removably secured together for ease in dismantling and having two parallel open sides therein to form a passageway therethrough for being removably positioned within said housing so that an air stream passing through the air cooling and heating system will pass through said cartridge passageway, said cartridge means further including (1) mating tongue and groove means on each of said four separate sides for removably securing said sides together through a friction fit under compression of the closed-cell foam material, (2) sealing means on the outside surface thereof comprising elongate grooves on each outside surface thereof along the entire dimensions of the surface and of slightly smaller dimensions than said rib members on the inside surface of said housing for mating engagement with said rib members and so that the cartridge material surrounding said grooves will be compressed when said rib members are force-fitted therein to insure sealing engagement between said housing and said cartridge means, and (3) complementary, zig-zag shaped, sealing grooves formed on opposite inside surfaces of said cartridge means along the entire dimensions thereof; and (c) replaceable porous filter media means removably positioned within said cartridge means in a pleated arrangement forming a plurality of downstream pockets in the air flow stream passing through said assembly and having opposite edges thereof positioned within said zig-zag shaped sealing grooves and extending across the entire interior opening in said cartridge means in sealing engagement therewith to force the flow of air through said media.

References Cited

UNITED STATES PATENTS

| | | | |
|---|---|---|---|
| 1,899,007 | 2/1933 | Birkholz | 55—500 |
| 2,071,806 | 2/1937 | Walker | 55—499 |
| 2,405,293 | 8/1946 | Dahlman. | |
| 2,473,006 | 6/1949 | Campbell | 55—481 |
| 3,144,315 | 8/1964 | Hunn | 55—521 |
| 3,177,637 | 4/1965 | Davis | 55—483 |
| 3,222,848 | 12/1965 | Koble | 55—481 |
| 3,222,850 | 12/1965 | Hart | 55—500 |
| 3,246,457 | 4/1966 | De Baun | 210—493 |
| 3,247,652 | 4/1966 | Annas et al. | 55—481 |
| 3,258,900 | 7/1966 | Harms | 210—493 |
| 3,360,910 | 1/1968 | Soltis | 55—483 |
| 3,375,640 | 4/1968 | Pelosi | 55—506 |
| 3,392,846 | 7/1968 | Getzin | 55—497 |
| 3,411,273 | 11/1968 | Duncan et al. | 55—481 |
| 3,423,908 | 1/1969 | Hart | 55—484 |

FOREIGN PATENTS 880,427  10/1961  Great Britain.

HARRY B. THORNTON, Primary Examiner

BERNARD NOZICK, Assistant Examiner

U.S. Cl. X.R.

55—486, 497, 500, 502, 521, 524, 528; 210—493

UNITED STATES PATENT OFFICE
CERTIFICATE OF CORRECTION

Patent No. 3,494,113  Dated February 10, 1970

Inventor(s) William L. Kinney

It is certified that error appears in the above-identified patent and that said Letters Patent are hereby corrected as shown below:

Column 6, Claim 1, line 19, "side" should be --inside--.

SIGNED AND
SEALED
JUN 30 1970

(SEAL)
Attest:

Edward M. Fletcher, Jr.
Attesting Officer

WILLIAM E. SCHUYLER, JR.
Commissioner of Patents